(12) United States Patent
Tanaka

(10) Patent No.: US 8,630,003 B2  
(45) Date of Patent: Jan. 14, 2014

(54) APPARATUS, SYSTEM AND METHOD OF CUSTOMIZING IMAGE FORMATION INSTRUCTIONS

(75) Inventor: Mizuka Tanaka, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 776 days.

(21) Appl. No.: 12/411,086

(22) Filed: Mar. 25, 2009

(65) Prior Publication Data

US 2010/0097636 A1    Apr. 22, 2010

(30) Foreign Application Priority Data

Oct. 22, 2008    (JP) ................................. 2008-272209

(51) Int. Cl.
  G06F 3/12    (2006.01)
(52) U.S. Cl.
  USPC ......................................................... 358/1.15
(58) Field of Classification Search
  USPC ............................................ 358/1.1, 1.15, 1.2
  See application file for complete search history.

(56) References Cited

U.S. PATENT DOCUMENTS

| | | | |
|---|---|---|---|
| 7,617,446 B2 * | 11/2009 | Dutta .............................. | 715/234 |
| 7,852,495 B2 | 12/2010 | Martin et al. | |
| 7,952,737 B2 | 5/2011 | Hiruma et al. | |
| 2001/0006586 A1 * | 7/2001 | Day et al. ......................... | 400/76 |
| 2002/0001102 A1 * | 1/2002 | Williams ...................... | 358/1.18 |
| 2002/0051253 A1 * | 5/2002 | Chen et al. ...................... | 358/505 |
| 2003/0011801 A1 * | 1/2003 | Simpson et al. .............. | 358/1.13 |
| 2003/0014446 A1 * | 1/2003 | Simpson et al. .............. | 707/527 |
| 2003/0053102 A1 * | 3/2003 | Kelsey .......................... | 358/1.13 |
| 2003/0069921 A1 * | 4/2003 | Lamming et al. ............. | 709/203 |
| 2004/0059435 A1 * | 3/2004 | Goldberg et al. .................. | 700/1 |
| 2004/0136021 A1 | 7/2004 | Martin et al. | |
| 2005/0128527 A1 * | 6/2005 | Brawn et al. ................... | 358/401 |
| 2006/0238794 A1 * | 10/2006 | Hada ............................ | 358/1.13 |
| 2007/0070411 A1 | 3/2007 | Hiruma et al. | |
| 2007/0279681 A1 * | 12/2007 | Matoba ........................ | 358/1.15 |

FOREIGN PATENT DOCUMENTS

| | | |
|---|---|---|
| JP | 2004-222278 A | 8/2004 |
| JP | 2004-243588 A | 9/2004 |
| JP | 2006-350848 A | 12/2006 |
| JP | 2007-122687 A | 5/2007 |
| JP | 2007-216585 A | 8/2007 |
| JP | 2007-324775 A | 12/2007 |

OTHER PUBLICATIONS

Japanese Office Action issued Nov. 13, 2012 in corresponding Japanese Patent Application No. 2008-272209.

* cited by examiner

*Primary Examiner* — Jeremiah Bryar

(74) *Attorney, Agent, or Firm* — Sughrue Mion, PLLC

(57) ABSTRACT

An image formation apparatus includes an accepting unit, an acquiring unit and a formation unit. The accepting unit accepts an image formation instruction and input of information for specifying image supply destinations. The acquiring unit acquires an image formation condition that is specified in advance for each image supply destination. The formation unit forms images based on the acquired image formation conditions.

13 Claims, 10 Drawing Sheets

FIG. 2

| User identifier (User ID) | User name | Smallest font size | Layout | Finisher | Bookbinding | Paper size | ... |
|---|---|---|---|---|---|---|---|
| 000 | (Not Specified) | 10.5pt | (Not Specified) | (Not Specified) | (Not Specified) | A4 | ... |
| 001 | X | 8pt | (Not Specified) | (Not Specified) | Centerline binding by staple | (Not Specified) | ... |
| 002 | Y | 10pt | 2 sided print | Hole-punching left side | (Not Specified) | (Not Specified) | ... |
| 003 | W | 10.5pt | 2 pages/sheet | Stapling upper left portion | (Not Specified) | (Not Specified) | ... |
| 004 | Z | 10.5pt | 2 pages/sheet | Stapling upper left portion | (Not Specified) | (Not Specified) | ... |
| ... | ... | ... | ... | ... | ... | ... | ... |

FIG. 6A

| User identifier (User ID) | User name | Smallest font size | Finisher | Bookbinding | Paper size | ... | Selection condition |
|---|---|---|---|---|---|---|---|
| 000 | (not specified) | 10.5 pt | (not specified) | (not specified) | A4 | ... | — |
| 001 | X | 8.5 pt | (not specified) | Centerline binding by staple | (not specified) | ... | 5 or more sheets ← C1 |
| 001 | X | 10 pt | Stapling upper left portion | (not specified) | (not specified) | ... | Others ← C2 |
| 002 | Y | 10.5 pt | Hole-punching left side | (not specified) | (not specified) | ... | — |
| ... | ... | ... | ... | ... | ... | ... | ... |

A ⟵ user columns; C ⟵ condition columns; S ⟵ Selection condition

FIG. 6B

| User identifier (User ID) | User name | Smallest font size | Finisher | Bookbinding | Paper size | ... | Selection condition |
|---|---|---|---|---|---|---|---|
| 000 | (not specified) | 10.5 pt | (not specified) | (not specified) | A4 | ... | — |
| 001 | X | 8.5 pt | (not specified) | Centerline binding by staple | (not specified) | ... | aaaa |
| 001 | X | 10 pt | Stapling upper left portion | (not specified) | (not specified) | ... | bbbb |
| ... | ... | ... | ... | ... | ... | ... | ... |

| Identifier | User identifier (USER ID) | User name | Group |
|---|---|---|---|
| aaaa | 001 | X | A |
| bbbb | 002 | Y | B |
| ⋮ | ⋮ | ⋮ | ⋮ |

APPARATUS, SYSTEM AND METHOD OF CUSTOMIZING IMAGE FORMATION INSTRUCTIONS

CROSS-REFERENCE TO RELATED APPLICATIONS

This application is based on and claims priority under 35 USC 119 from Japanese Patent Application No. 2008-272209 filed on Oct. 22, 2008.

BACKGROUND

Technical Field

The invention relates to an image formation apparatus, an image formation method, an image formation instruction apparatus, an image formation instruction method, an image formation system, a computer-readable medium and a computer data signal.

SUMMARY

According to an aspect of the invention, an image formation apparatus includes an accepting unit, an acquiring unit and a formation unit. The accepting unit accepts an image formation instruction and input of information for specifying image supply destinations. The acquiring unit acquires an image formation condition that is specified in advance for each image supply destination. The formation unit forms images based on the acquired image formation conditions.

BRIEF DESCRIPTION OF THE DRAWINGS

Exemplary embodiments of the invention will be described in detail based on the following figures, wherein:

FIG. 2 is an explanatory view showing an example of settings of image formation conditions that are utilized in the image formation system according to the exemplary embodiment of the invention;

FIGS. 6A and 6B are explanatory views showing another example of the settings of the image formation conditions, which are utilized in the image formation system according to the exemplary embodiment of the invention;

DETAILED DESCRIPTION

Figure 1:
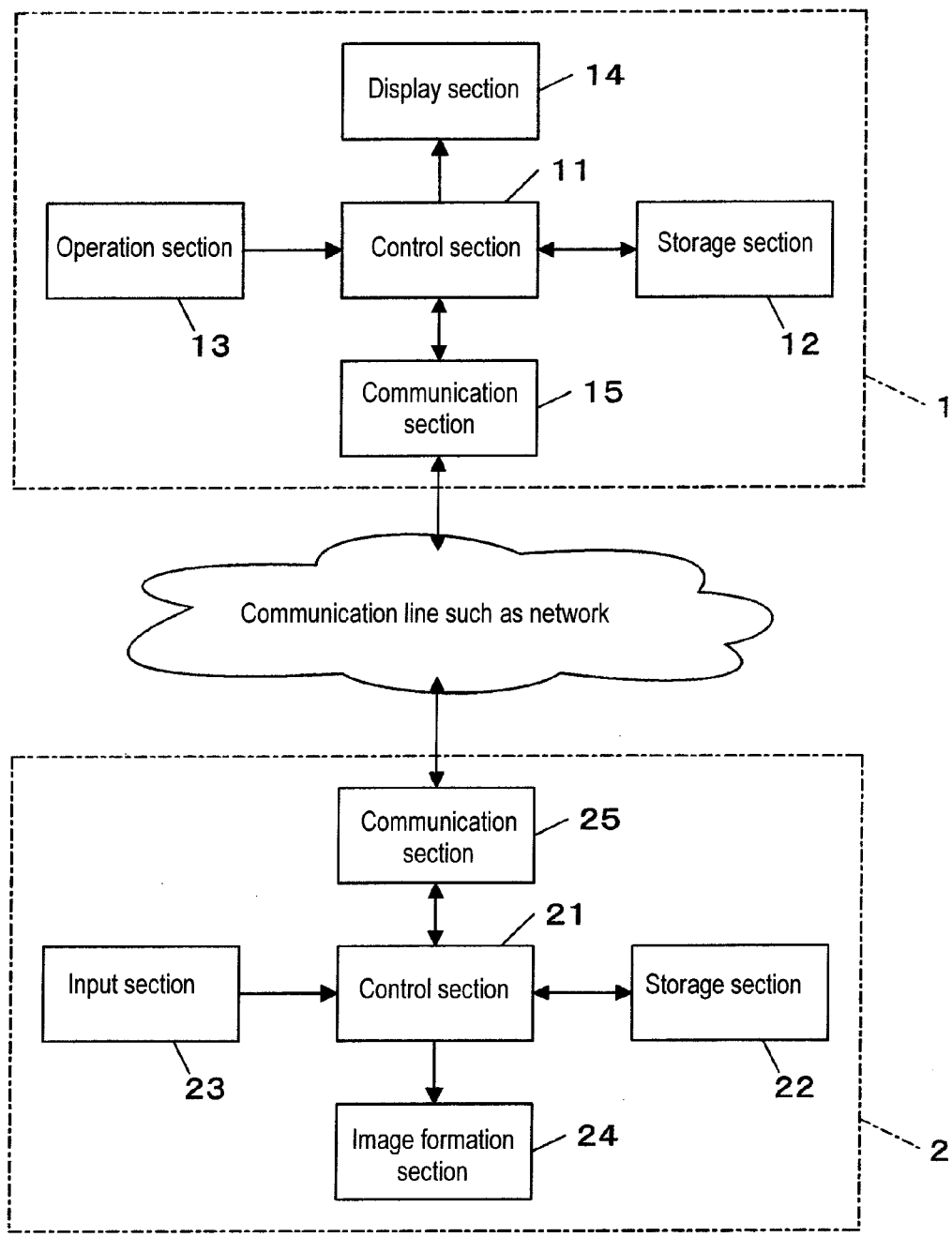
FIG. 1 is a block diagram showing a configurative example of an image formation system according to an exemplary embodiment of the invention.

An exemplary embodiment of the invention will be explained with reference to the accompanying drawings below. As illustrated in FIG. 1, an image formation system according to the exemplary embodiment includes an image formation instruction apparatus 1 and an image formation apparatus 2. Here, the image formation instruction apparatus 1 (an example of an image formation instruction apparatus) is configured to include a control section 11, a storage section 12, an operation section 13, a display section 14, and a communication section 15, for example. Also, the image formation apparatus 2 is configured to include a control section 21, a storage section 22, an input section 23, an image formation section 24, and a communicating section 25.

In the image formation instruction apparatus 1, the control section 11 is a program-controlled device such as CPU and operates in accordance with a program stored in the storage section 12. In one example of this exemplary embodiment, the control section 11 executes a process of transmitting an image formation instruction and information for specifying a formed-image supply destination(s) (image supply destination(s)).

The storage section 12 is configured to include a memory such as RAM (Random Access Memory) and/or a disk device, and stores the program to be executed by the control section 11. This program may be stored in a computer-readable recording medium such as DVD-ROM (Digital Versatile Disc Read Only Memory) and be provided by making its copy in the storage section 12. Also, the storage section 12 serves as a working memory of the control section 11.

The operation section 13 is constructed by a mouse, a keyboard, and/or the like. When receiving a user's operation, the operation section 13 outputs contents of the user's operation to the control section 11. The display section 14 is constructed by a display or the like, and outputs information in accordance with an instruction of the control section 11. Also, the communication section 15 is constructed by a network interface or the like, for example. This communication section 15 transmits/receives information to/from the image formation apparatus 2 via a communication line such as network in accordance with an instruction of the control section 11.

In the image formation apparatus 2, the control section 21 is also a program-controlled device such as CPU and operates in accordance with a program stored in the storage section 22. In one example of this exemplary embodiment, the control section 21 stores in advance in the storage section 22 an image formation condition that is specified for each image supply destination. Also, the control section 21 executes respective processes of accepting the image formation instruction and the information for specifying the image supply destination(s) from the image formation instruction apparatus 1 via the communicating section 25, then reading/acquiring from the storage section 22 the image formation condition for each image supply destination specified by the received information, and forming an image, that is a formation target, based on each acquired image formation condition. Details of the processes executed by the control section 21 will be described later.

The storage section 22 is constructed by a memory element, a disk device, or the like, and stores the program to be executed the control section 21. This program may be stored in a computer-readable recording medium such as DVD-ROM and be provided by making its copy in the storage section 22. Also, the storage section 22 serves as a working memory of the control section 21.

In one example of this exemplary embodiment, as described above, the image formation condition, which is specified for each image supply destination is stored in the storage section 22. For example, as illustrated in FIG. 2, the storage section 22 stores information (A) for specifying an image supply destination and the image formation condition (C) in association with each other. Here, for example, a user identifier (User ID) may be employed as the information (A) for specifying the image supply destination.

Also, a character string indicating a user name may be associated with the user identifier. Also, the image formation conditions (C) contain at least one image formation condition element. For example, the image formation condition elements of "smallest font size", "layout", "finisher", "bookbinding", and "paper size" are contained in FIG. 2. In the image formation condition corresponding to each user, "no specification (not specified)" may be applied to any of these image formation condition elements.

Respective users may input these image formation conditions to meet user's own preferences or the like, and store the image formation conditions in the storage section 22. For example, the user may transmit an the image formation condition to the image formation apparatus 2 via the communication line such as network and store the image formation condition in the storage section 22. Alternately, the user may store the image formation condition in the storage section 22 by operating the input section 23 of the image formation apparatus 2. Further alternatively, a server may manage the image formation conditions, and may transmit the image formation conditions to the image formation apparatus 2 or the image formation instruction apparatus 1, as needed.

When receiving an input of a user's instruction operation, the input section 23 outputs the instruction to the control section 21. This input section 23 may include keys such as a ten-key pad. The image formation section 24 prints an image (forms an image) on a recording medium such as a sheet of paper, for example, in accordance with the instruction input from the control section 21. The communicating section 25 is a network interface or the like, and outputs the image formation instruction, which is received via the communicating line such as the network, and the like to the control section 21.

Figure 3:
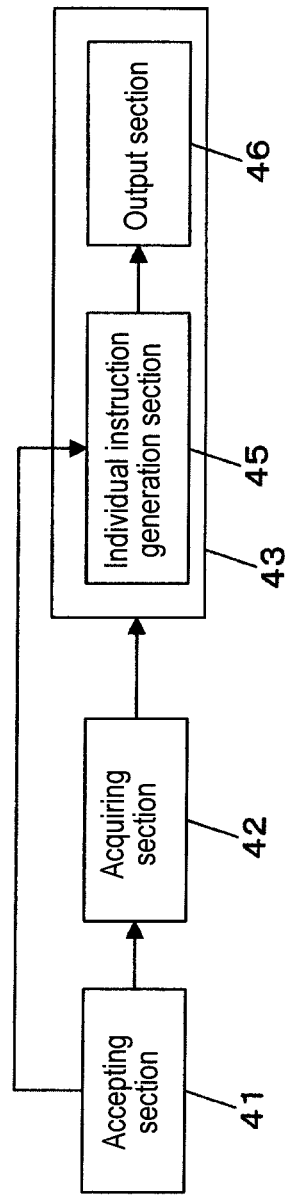
FIG. 3 is a functional block diagram according to one example of the image formation apparatus according to the exemplary embodiment of the invention.

Next, an operation of the control section 21 in one example of this exemplary embodiment will be explained below. As illustrated in FIG. 3, the control section 21 in this example is configured to functionally include an accepting section 41, an acquiring section 42, and a formation section 43. Also, the formation section 43 has an individual instruction generation section 45 and an output section 46.

The accepting section 41 receives the image formation instruction and the information for specifying the image supply destination(s) from the image formation instruction apparatus 1. Here, as an outline shown in FIG. 4, the image formation instruction includes an instruction regarding a paper size (S), an instruction regarding a layout (L), an instruction regarding drawing of an image to be formed (B), an instruction regarding a finisher (F), an instruction regarding a bookbinding (X), and others. Also, the instruction regarding the drawings (B) is divided in units of pages, for example, and a drawing command for drawing an image in each page may contain information for specifying a font size, information for specifying a type of the font, and the like.

The acquiring section 42 reads/acquires the image formation condition, which is specified in advance for each image supply destination, from the storage section 22 by referring to the information, which is received together with the image formation instruction and specifies the supply destination(s) of the accepted image, and outputs the image formation conditions to the formation section 43.

The individual instruction generation section 45 of the formation section 43 rewrites the image formation instruction based on the image formation condition for each image supply destination, which is acquired by the acquiring section 42, so as to generate an image formation instruction (an individual instruction) for each image supply destination.

That is, the individual instruction generation section 45 selects one of the acquired image formation conditions as an image formation condition in question. Then, the individual instruction generation section 45 refers to the received image formation instruction, and rewrites respective instructions contained in this instruction in accordance with the image formation condition in question. Also, when rewriting the instruction, the individual instruction generation section 45 makes an adjustment that is necessitated by the rewriting. For example, when the accepting section 41 accepts an image formation condition containing specification of a paper size A3 while the paper size is set to A4 in the image formation condition in question, the individual instruction generation section 45 rewrites the specification of the paper size A3 into the specification of the paper size A4. In addition, in order to include a one-page image having an A3 size in a one page having an A4 size, the individual instruction generation section 45 applies a reduction process for specification of coordinates and the like in the drawing command in accordance with a paper size ratio (a ratio of A4 to A3). Also, the individual instruction generation section 45 also reduces font sizes in accordance with this paper size ratio.

Furthermore, when the image formation condition elements such as "2 sided", "forming images of N pages on one sheet of paper", and the like are contained in the image formation condition in question as the layout setting, the individual instruction generation section 45 changes respective settings contained in the accepted image formation instruction. Similarly, the "finisher setting" and the "bookbinding setting" are also rewritten or appended.

Also, when an image formation condition element "smallest font size" is contained in the image formation condition in question, the individual instruction generation section 45 checks as to whether or not the image formation instruction contains specification of a font size being equal to or less than the "smallest font size" specified by such an image formation condition element. When the specification of such a font size is contained, the individual instruction generation section 45 rewrites the specification of the font size, which is equal to or less than the "smallest font size" to specification of the "smallest font size".

The output section 46 outputs the individual instruction(s) generated by the individual instruction generation section 45 to the image formation section 24, and causes the image formation section 24 to form an image(s) based on the individual instruction(s).

Figure 5:
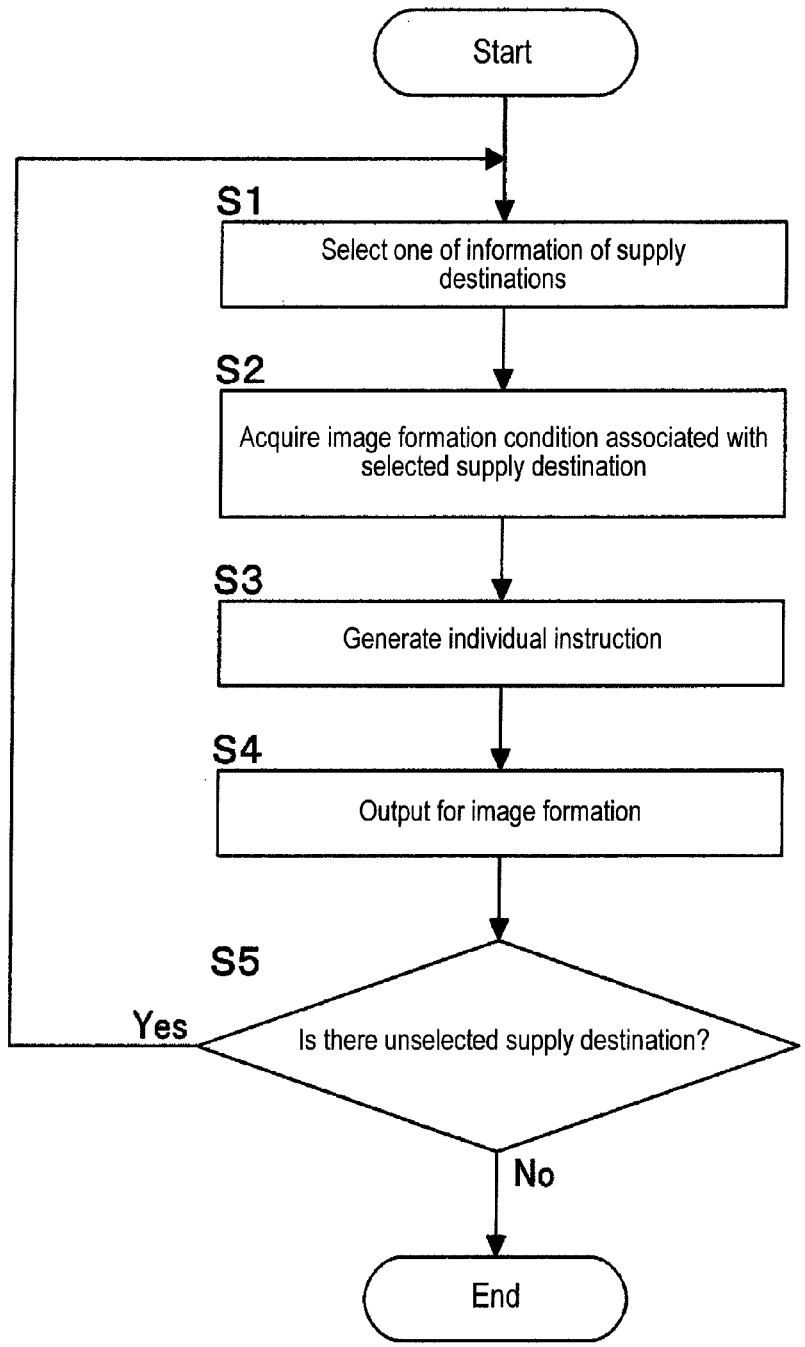
FIG. 5 is a flowchart for explaining operations in one example of the image formation apparatus according to the exemplary embodiment of the invention.

That is, the control section 21 in this example receives the image formation instruction and the information for specifying the image supply destination(s) (formed-image supply destination(s)) from the image formation instruction apparatus 1, and starts the process shown in FIG. 5.

The control section 21 selects one of the information (not yet selected) of the supply destination(s) of the accepted image (step S1). The control section 21 reads an image formation condition associated with the information of the selected supply destination from the storage section 22 (step S2). The read image formation condition is handled as an image formation condition in question.

The control section 21 generates an image formation instruction (an individual instruction) for the selected image supply destination, based on the accepted image formation instructions and the image formation condition in question (step S3). That is, the control section 21 generates the individual instruction by overwriting settings of the image formation condition in question on settings specified in the accepted image formation instruction. Accordingly, in this example, as to the settings not specified, the settings contained in the original image formation instruction (the settings specified by a user of the image formation instruction apparatus 1) are used as they are.

The control section 21 outputs the generated individual instruction to the image formation section 24 (step S4). The control section 21 checks as to whether or not there is an unselected supply destination in the information of the supply destinations of the accepted image (step S5). If the unselected information remains yet, the control section 21 selects one of the unselected information. Then, the flow goes back to step S1 to continue the process.

Also, if there remains no unselected information in step S5, i.e., if image formation for all the specified supply destinations is completed, the control section 21 ends the process.

In this case, when outputting the individual instruction generated in step S4 to the image formation section 24, the control section 21 may instruct the image formation section 24 to output a sheet of paper, on which information such as the user identifier and the user name being associated with the image formation condition in question read in step S2 are formed, before the images is formed in accordance with the individual instructions, which is generated based on the image formation condition in question, or after the image is formed.

Also, the control section 21 may generate an image of a list of information such as the user identifier and the user name being associated with the selected image formation conditions in order of selection of the supply destinations in step S1. Then, the control section 21 may instruct the image formation section 24 to output a sheet of paper, on which an image of the generated list is formed, before the images are formed in accordance with the individual instructions or after the images are formed.

Also, the order of selection of the supply destinations in step S1 (i.e., an order of the image formation) may be set to either an ascending order of the user identifiers, a descending order of the user identifiers, an alphabetical order of the user names or a Japanese syllabary order of the user names. Also, this order of selection may be varied based on the contents of the image formation instructions for the respective specified supply destinations. For example, the order of selection of the supply destination may be an order of the paper size. The order of the paper size may be determined in advance like A4→A3→B4 . . . , for example. Then, the control section 21 may select the supply destinations sequentially in accordance with this predetermined order from a supply destination associated with an image formation condition containing specification of A4 size, for example.

In the above explanation, as to the image formation condition elements not specified in the image formation condition in question, the settings contained in the original image formation instructions (the settings specified by the user of the image formation instruction apparatus 1) are utilized as they are. However, this exemplary embodiment is not limited thereto. For example, the control section 21 may receive in advance prescribed values about the respective settings for storage in the storage section 22, read the prescribed values stored in the storage section 22 with respect to the settings of the image formation condition element not specified in the image formation condition in question, and rewrite the settings to the prescribed values.

Also, in another example of this exemplary embodiment, as shown in FIG. 6A, plural image formation conditions may be associated with the information for specifying the image supply destination. In this case, in the information stored in the storage section 22, a selection condition (S) for selecting an image formation condition is further associated with each of the plural image formation conditions (C), which are associated with the information (A) for specifying one image supply destination.

Here, the selection conditions may be set based upon the contents of the image formation instruction, which are a process target. For an example, a selection condition may depend on the number of sheets of the paper on which images are formed in accordance with the image formation instruction, which is the process target. In this example, specifically, the selection conditions are set so that if the number of sheets of paper is equal to or larger than five, a first image formation condition (C1) is selected; otherwise, a second image formation conditions (C2) is selected.

Also, regardless of the contents of the image formation instruction, the selection conditions may be set based on information that is specified together with the image formation instruction. For example, as shown in FIG. 6B, the selection condition may be a character string that contains one or more characters and is set by a user, such as a purpose ("for conference" or the like), information for specifying a conference in which an image formed by the image formation instruction will be used as a handout or the like, a list of conferees, and the like. In this case, the user of the image formation instruction apparatus 1, which generates and outputs the image formation instruction, inputs a predetermined character string (will be referred to as "information regarding the selection conditions"), such as information for specifying a conference in which an image formed on the paper will be used as a handout or a purpose (e.g., "for conference"), as a utilization form of the sheets of paper on which images are formed by the image formation instruction. The image formation instruction apparatus 1 transmits the character string, which is the information regarding the selection conditions being input by the user as well as the image formation instruction and the information for specifying the distribution destination(s). The image formation apparatus 2 accepts the information regarding the selection conditions as well as the image formation instruction and the information for specifying the distribution destination(s). Then, the image formation apparatus 2 selectively reads the image formation conditions associated with the selection conditions, which meet the information regarding the accepted selection conditions (when the image formation apparatus 2 accepts plural character strings, it may compare the accepted character strings with respective character strings contained in the selection conditions in no particular order or may compare the accepted character strings in order of acceptance to determine as to whether or not both character strings are identical with each other) from among the plural image formation conditions associated with the respective distribution destinations. Then, the image formation apparatus 2 generates the individual instructions for the respective distribution destinations base on the selectively read image formation conditions.

Also, the information (A) for specifying the image supply destination is not always determined for respective individuals who are the distribution destinations. The information (A) may be determined for respective groups that are the distribution destinations. In this case, the information for specifying a group may be used as the information for specifying the image supply destination. Here, the storage section 22 may store the image formation conditions for the respective individuals and the image formation conditions for the respective groups together. In this case, when the accepted information of distribution destinations correspond to the information for specifying a group, the control section 21 of the image formation apparatus 2 reads the image formation condition associated with the group specified by the concerned information, and then generates the individual instruction. The individual instruction generated at this time is based upon the image formation condition, which is specified in advance to correspond to the group specified by the concerned information.

Figures 7, 8:
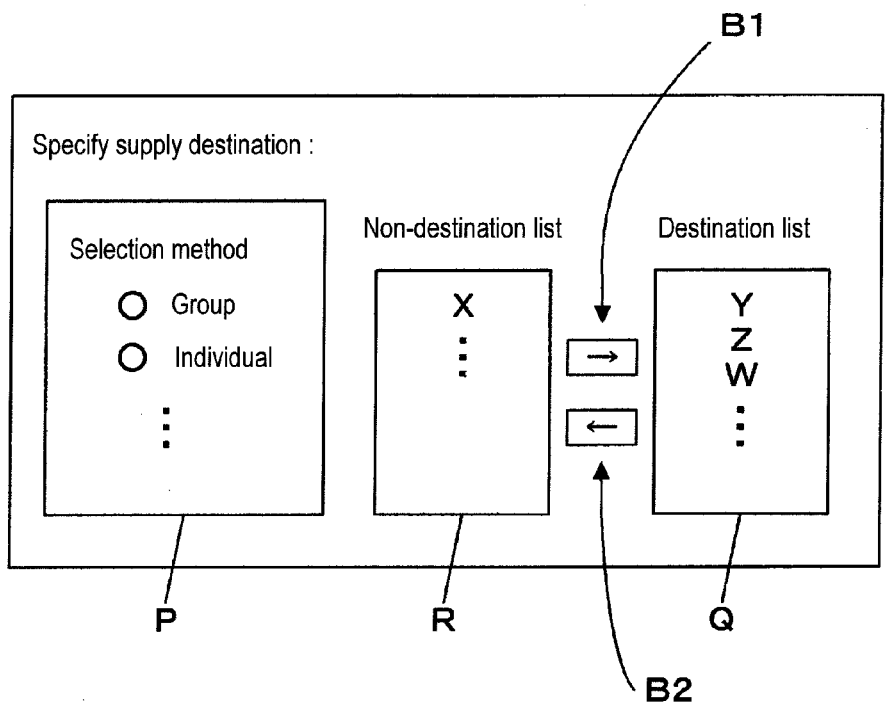
FIG. 7 is an explanatory view for explaining an example of contents of a group database that is utilized in the image formation system according to the exemplary embodiment of the invention.
FIG. 8 is an explanatory view for explaining an example of an interface screen on which an image supply destination is specified, in the image formation system according to the exemplary embodiment of the invention.

In this manner, when the information of distribution destinations contains the specification of the image formation conditions for the respective groups, the storage section 12 or the storage section 22 may store a group database for correlating the users with the groups to which the users belong. For example, as illustrated in FIG. 7, the identifier, the user ID, the user name, the information for specifying the group are associated with each other in this group database. Here, the number of groups to which one user belongs is not always limited to one.

For example, when the group is specified, the image formation apparatus 2 uses this group database to determine how many times the image formation should be executed (the number of prints). That is, the number of users who belong to the specified group may be counted. Also, for example, the image formation instruction apparatus 1 uses this group database in a process for specifying a distribution destination(s).

That is, the image formation instruction apparatus 1 accepts the image formation instruction as well as the information for specifying the supply destination from the user. For example, the image formation instruction apparatus 1 displays an interface screen shown in FIG. 8. This interface screen contains an interface portion used to select as to whether a distribution destination(s) should be specified on a "group" basis or an "individual" basis (selection method list: P), a list of the users and the groups as the distribution destinations (destination list: Q), and an interface portion used to display the users and the groups not specified as the distribution destination in a list form (non-destination list: R). Also, this interface contains a button interface B1 used to move the users and the groups selected from the non-destination list to the destination list, and a button interface B2 used to move the users and the groups selected from the destination list to the non-destination list. The user inputs the users and the groups as the distribution destinations into the interface portion of the destination list by clicking this button interface B1 with the mouse, or the like.

In this case, as the selection method list, either of options "group" or "individual" can be selected. Alternatively, plural selection options may be selected at a time. When either of two selection options should be rendered selectable, the control section 11 displays a list of the users or the groups corresponding to the selected option on the destination list and the non-destination list. Also, if plural selection options should be rendered selectable at a time, the control section 11 displays a list of the users or the groups corresponding to the selected option on the destination list and the non-destination list.

At this time, the control section 11 reads the information for specifying the users belonging to the group contained in the destination list, for example, from the group database. In this case, even if the individual-basis selection is instructed, the control section 11 performs control so that the users who belong to the group contained in the destination list are not displayed in the non-destination list (exclude such users from the non-destination list). That is, the control section 11 controls the users or contents of the groups, which are the distribution destinations, with reference to the group database.

This interface screen can be accomplished as a program that issues an instruction to the image formation apparatus 2 or as a software implemented by a web site.

When the user instructs to send out the image formation instruction, the control section 11 generates the information for specifying the destination(s) contained in the destination list as the distribution destination(s), and sends out such information together with the image formation instruction.

Figure 9:
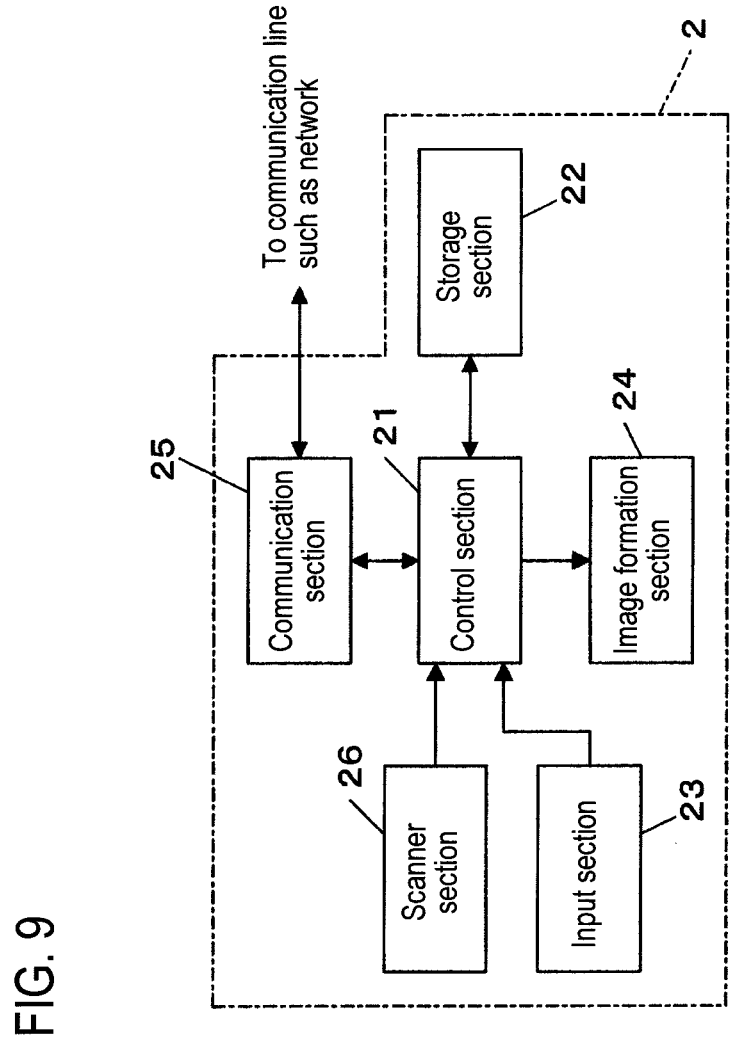
FIG. 9 is a block diagram showing another example of the image formation apparatus according to the exemplary embodiment of the invention.

Also, in one example of this exemplary embodiment, the image formation instruction may be generated not by the image formation instruction apparatus 1 but by the image formation apparatus 2. FIG. 9 is a configuration block diagram showing another example of the image formation apparatus according to this exemplary embodiment. In this example, the image formation apparatus 2 contains a control section 21, a storage section 22, an input section 23, an image formation section 24, a communicating section 25, and a scanner section 26 that is an example of a reading unit. Here, the same reference numerals are affixed to the same configurations as those in the example described above, and detailed explanation thereon will be omitted. Also, in this example, the image formation instruction apparatus 1 is not always connected communicatively. Therefore, the communicating section 25 is not always needed.

The scanner section 26 is a flatbed scanner, for example. This scanner section 26 optically reads an original image that is fixed to (formed on) a medium being put on a reading surface thereof in accordance with an instruction input from the control section 21, and outputs the read image to the control section 21. The control section 21 generates an instruction to form an image same as the read image, as the image formation instruction. In this case, the control section 21 accepts the input from the input section 23, instead of the information of the image supply destination(s) sent from the image formation instruction apparatus 1.

In this case, like the image formation instruction apparatus 1 in the example described above, for example, the input section 23 displays the interface screen illustrated in FIG. 8, accepts specification of distribution destination(s), and outputs such specification to the control section 21.

The accepting section 41 of the control section 21 accepts the image formation instruction of the image read by the scanner section 26 and the information for specifying the distribution destination(s) input by the input section 23, and outputs them to the acquiring section 42 and the formation section 43.

That is, the control section 21 is this example accepts the image formation instruction, which is generated based on the image read by the scanner section 26, and the information for specifying the formed-image supply destination(s), and starts the process shown in FIG. 5.

Further, in further another example of this exemplary embodiment of the invention, the individual instructions are generated not in the image formation apparatus 2 but in the image formation instruction apparatus 1, and then are sent out to the image formation apparatus 2. The image formation system according to this example has the similar configuration to that illustrated in FIG. 1. In this case, mainly the operations of the control section 11 of the image formation instruction apparatus land the control section 21 of the image formation apparatus 2 are different. Therefore, the operations of the control section 11 and the control section 21 will be explained below.

Figure 10:
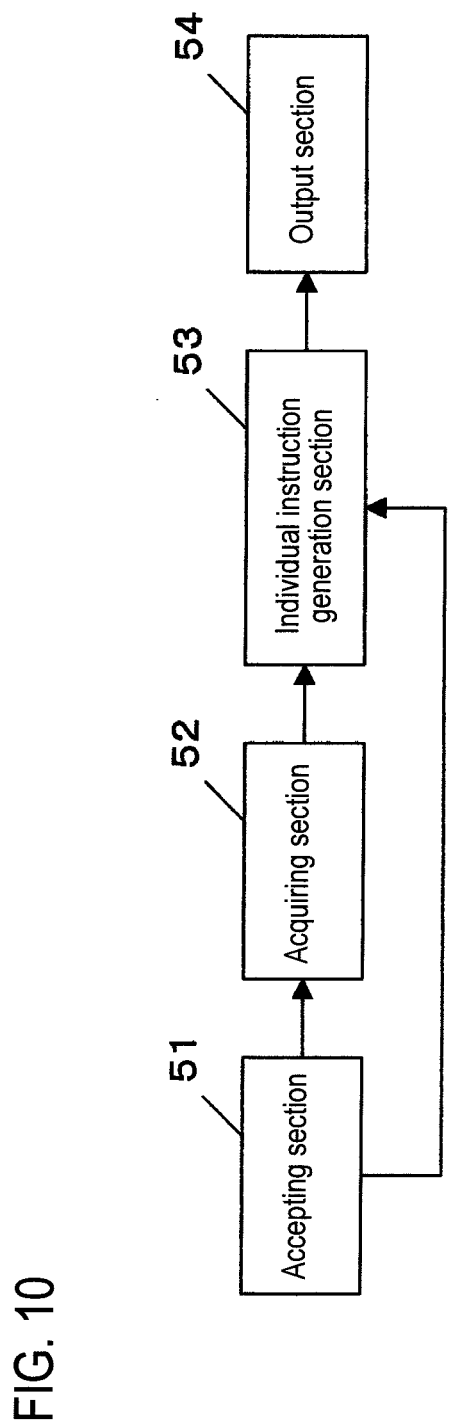
FIG. 10 is a functional block diagram in the other example of the image formation apparatus according to the exemplary embodiment of the invention.

According to this example of this exemplary embodiment, the information for specifying the distribution destinations and the information of the image formation conditions associated with the information for specifying the distribution destination(s), as illustrated in FIG. 2, are stored in the storage section 12 of the image formation instruction apparatus 1. In this case, each user may input the image formation condition to meet the user's preference, and store the image formation condition in the storage section 12. For example, the user may sends out the image formation condition to the image formation apparatus 2 via the communication line such as network to store the image formation condition in the storage section 22. Alternatively, the user may store the image formation condition in the storage section 22 by operating the input section 23 of the image formation apparatus 2. Also, as illustrated in FIG. 10, the control section 11 functionally includes an accepting section 51, an acquiring section 52, an individual instruction generation section 53, and an output section.

Figure 4:
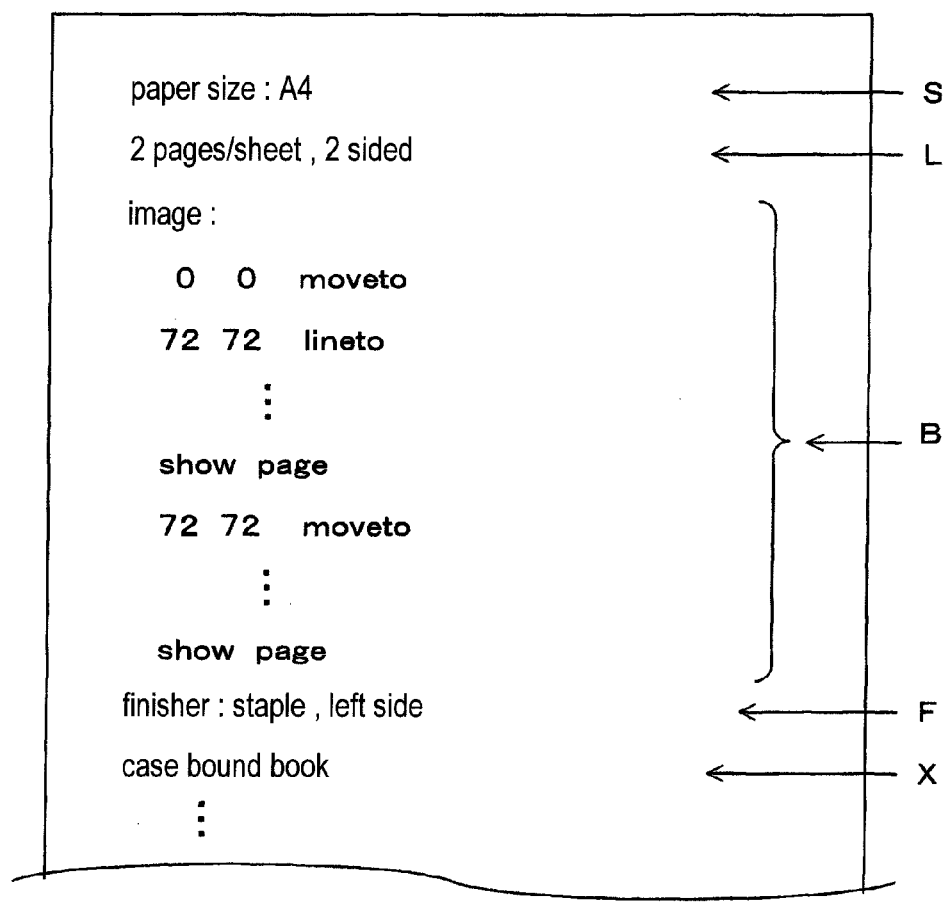
FIG. 4 is an explanatory view for explaining an example of contents of an image formation instruction as a process target of the image formation system according to the exemplary embodiment of the invention.

The accepting section 51 accepts the image formation instruction and the information for specifying the formed-image supply destination(s) from the user. Here, this accepting section 51 accepts the image formation instruction as the operation applied to the application program such as the word processor or the like, for example, and then the control section 11 generates the image formation instructions whose outline is illustrated in FIG. 4. As described above, the instruction regarding the paper size (S), the instruction regarding the layout (L), the instruction regarding the drawing of the image to be formed (B), the instruction regarding the finisher (F), the instruction regarding the bookbinding (X), and others are contained. Also, the instruction regarding the drawing (B) is divided in units of pages, for example, and information for specifying a font size, information for specifying a font type, and the like may be contained as the drawing command of the image drawn on each page.

Also, as described by way of the example in FIG. 8, the information for specifying the image supply destination(s) may be accepted via the interface screen.

The acquiring section 52 reads/acquires the image formation condition(s), which is specified in advance for the respective image supply destination(s), from the storage section 12 by referring to the information, which is received from the user and specifies the supply image destination(s), and outputs the read/acquired condition(s) to the individual instruction generation section 53.

The individual instruction generation section 53 rewrites the image formation instruction based on the image formation conditions, which are acquired by the acquiring section 52 for the respective image supply destinations, and generates the image formation instruction (individual instruction) for each image supply destination.

That is, the individual instruction generation section 53 selects one of the acquired image formation conditions as an image formation condition in question. Then, the individual instruction generation section 53 refers to the received image formation instruction, and rewrites respective instructions contained in this instruction in accordance with the image formation condition in question. Also, when rewriting the instruction, the individual instruction generation section 53 makes an adjustment that is necessitated by the rewriting. For example, when the accepting section 51 accepts an image formation condition containing specification of a paper size A3 while the paper size is set to A4 in the image formation condition in question, the individual instruction generation section 53 rewrites the specification of the paper size A3 into the specification of the paper size A4. In addition, in order to include a one-page image having an A3 size in a one page having an A4 size, the individual instruction generation section 53 applies a reduction process for specification of coordinates and the like in the drawing command in accordance with a paper size ratio (a ratio of A4 to A3). Also, the individual instruction generation section 53 also reduces font sizes in accordance with this paper size ratio.

Furthermore, when specification such as "2 sided", "forming images of N pages on one sheet of paper", and the like is contained in the image formation condition in question as the layout setting, the individual instruction generation section 53 changes respective settings contained in the accepted image formation instruction. Similarly, the "finisher setting" and the "bookbinding setting" are also rewritten or appended.

Also, when specification of "smallest font size" is contained in the image formation condition in question, the individual instruction generation section 53 checks as to whether or not the image formation instruction contains specification of a font size being equal to or less than the "smallest font size" specified by such an image formation condition element. When the specification of such a font size is contained, the individual instruction generation section 53 rewrites the specification of the font size, which is equal to or less than the "smallest font size" to specification of the "smallest font size".

The output section 54 outputs the individual instruction(s) generated by the individual instruction generation section 53 to the image formation apparatus 2, and causes the image formation apparatus 2 to form an image(s) based on the individual instruction(s).

Figure 11:
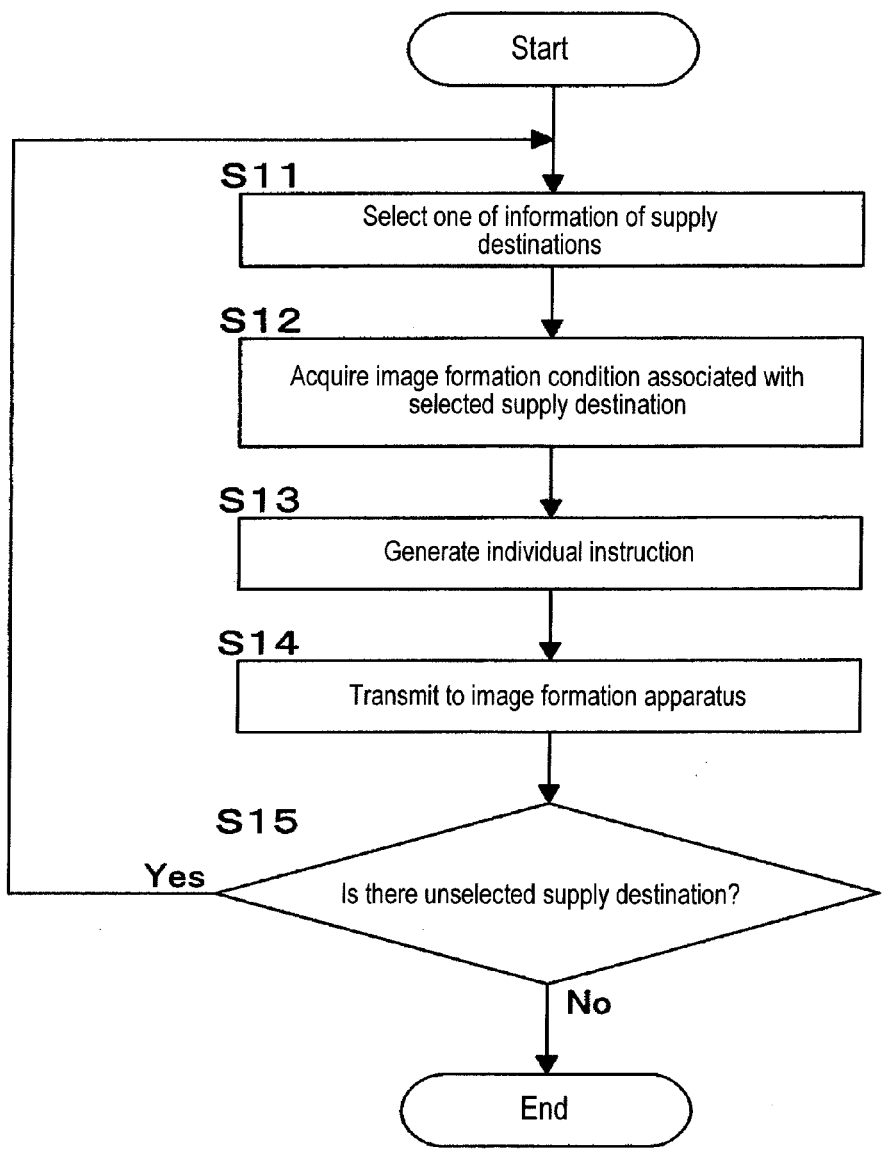
FIG. 11 is a flowchart for explaining operations in the other example of the image formation instruction apparatus according to the exemplary embodiment of the invention.

That is, the control section 11 receives the image formation instruction and the information for specifying the image supply destination(s) (formed-image supply destination(s)) from the user, and starts the process shown in FIG. 11.

The control section 11 selects one of the information (not yet selected) of the supply destination(s) of the accepted image (step S11). The control section 11 reads an image formation condition associated with the information of the selected supply destination from the storage section 12 (step S12). The read image formation condition is handled as an image formation condition in question.

The control section 11 generates an image formation instruction (an individual instruction) for the selected image supply destination, based on the accepted image formation instructions and the image formation condition in question (step S13). That is, the control section 11 generates the individual instruction by overwriting settings of the image formation condition in question on settings specified in the accepted image formation instruction. Accordingly, in this example, as to the settings not specified, the settings contained in the original image formation instruction (the settings specified by a user of the image formation instruction apparatus 1) are used as they are.

The control section 11 outputs the generated individual instruction to the image formation apparatus 2 (step S14). The control section 11 checks as to whether or not there is an unselected supply destination in the information of the supply destinations of the accepted image (step S15). If the unselected information remains yet, the control section 11 selects one of the unselected information. Then, the flow goes back to step S11 to continue the process.

Also, if there remains no unselected information in step S15, i.e., if image formation for all the specified supply destinations is completed, the control section 11 ends the process.

In this case, when outputting/transmitting the individual instruction generated in step S14 to the image formation apparatus 2, the control section 11 may instruct the image formation apparatus 2 to output a sheet of paper, on which information such as the user identifier and the user name being associated with the image formation condition in question read in step S12 are formed, before the images is formed in accordance with the individual instructions, which is generated based on the image formation condition in question, or after the image is formed.

Also, the control section 11 may generate an image of a list of information such as the user identifier and the user name being associated with the selected image formation conditions in order of selection of the supply destinations in step S11. Then, the control section 11 may instruct the image formation apparatus 2 to output a sheet of paper, on which an image of the generated list is formed, before the images are formed in accordance with the individual instructions or after the images are formed.

Also, the order of selection of the supply destinations in step S11 (i.e., an order of the image formation) may be set to either an ascending order of the user identifiers, a descending order of the user identifiers, an alphabetical order of the user names or a Japanese syllabary order of the user names. Also, this order of selection may be varied based on the contents of the image formation instructions for the respective specified supply destinations. For example, the order of selection of the supply destination may be an order of the paper size. The order of the paper size may be determined in advance like A4→A3→B4 . . . , for example. Then, the control section 21 may select the supply destinations sequentially in accordance with this predetermined order from a supply destination associated with an image formation condition containing specification of A4 size, for example.

In the above explanation, as to the settings not specified in the image formation condition in question, the settings contained in the original image formation instructions (the settings specified by the user) are utilized as they are. However, this exemplary embodiment is not limited thereto. For example, the control section 11 may receive in advance prescribed values about the respective settings for storage in the storage section 12, read the prescribed values stored in the storage section 12 with respect to the settings not specified in the image formation condition in question, and rewrite the settings to the prescribed values.

Also, in another example of this exemplary embodiment, as shown in FIG. 6A, plural image formation conditions may be stored in the storage section 12 in association with the information for specifying the image supply destination. In this case, the selection conditions may be set based upon the contents of the image formation instruction, which are a process target. For an example, a selection condition may depend on the number of sheets of the paper on which images are formed in accordance with the image formation instruction, which is the process target. In this example, specifically, the selection conditions are set so that if the number of sheets of paper is equal to or larger than five, a first image formation condition (C1) is selected; otherwise, a second image formation conditions (C2) is selected.

Also, regardless of the contents of the image formation instruction, the selection conditions may be set based on information that is specified together with the image formation instruction. For example, as shown in FIG. 6B, the selection condition may be a character string that contains one or more characters and is set by a user, such as a purpose ("for conference" or the like), information for specifying a conference in which an image formed by the image formation instruction will be used as a handout or the like, a list of conferees, and the like. In this case, the user of the image formation instruction apparatus 1, which generates and outputs the image formation instruction, inputs a predetermined character string (will be referred to as "information regarding the selection conditions"), such as information for specifying a conference in which an image formed on the paper will be used as a handout or a purpose (e.g., "for conference"), as a utilization form of the sheets of paper on which images are formed by the image formation instruction. The image formation instruction apparatus 1 transmits the character string, which is the information regarding the selection conditions being input by the user as well as the image formation instruction and the information for specifying the distribution destination(s). The image formation apparatus 2 accepts the information regarding the selection conditions as well as the image formation instruction and the information for specifying the distribution destination(s). Then, the image formation apparatus 2 selectively reads the image formation conditions associated with the selection conditions, which meet the information regarding the accepted selection conditions (when the image formation apparatus 2 accepts plural character strings, it may compare the accepted character strings with respective character strings contained in the selection conditions in no particular order or may compare the accepted character strings in order of acceptance to determine as to whether or not both character strings are identical with each other) from among the plural image formation conditions associated with the respective distribution destinations. Then, the image formation apparatus 2 generates the individual instructions for the respective distribution destinations base on the selectively read image formation conditions.

Also, the information (A) for specifying the image supply destination is not always determined for respective individuals who are the distribution destinations. The information (A) may be determined for respective groups that are the distribution destinations. In this case, the information for specifying a group may be used as the information for specifying the image supply destination. Here, the storage section 12 may store the image formation conditions for the respective individuals and the image formation conditions for the respective groups together. In this case, when the accepted information of distribution destinations correspond to the information for specifying a group, the control section 11 of the image formation instruction apparatus 1 reads the image formation condition associated with the group specified by the concerned information, and then generates the individual instruction. The individual instruction generated at this time is based upon the image formation condition, which is specified in advance to correspond to the group specified by the concerned information.

In this manner, when the information of distribution destinations contains the specification of the image formation conditions for the respective groups, the storage section 12 may store a group database for correlating the users with the groups to which the users belong. The group database may be similar to that shown in FIG. 7.

When the groups are specified as the distribution destinations, the image formation instruction apparatus 1 counts the number of users who belong to the specified groups by referring to this group database, and sets this counted number as the number indicating how many times the image formation should be executed (the number of prints).

In the above description, upon selecting the information for specifying the image supply destination, the image formation instruction apparatus 1 or the image formation apparatus 2 accepts an input by referring to the information in which the user names, etc. are recorded in advance, e.g., the group database. However, the acceptance of the information is not limited thereto. As the information for specifying the supply destination, information of users who are managed by another application software may be used. For example, when software for managing the schedule of the user is operating on a server (not shown), the image formation instruction apparatus 1 or the image formation apparatus 2 may acquire the information of the user contained in the schedule information from the server, and then generate the information for specifying the image supply destination based on the acquired information of the user.

Concretely, when the schedule name (information such as a character string indicating the contents of the schedule such as a "conference", date and time of the schedule and the like) and a list of the users who are associated with the schedule (a list of conferees, or the like) are associated with each other in the schedule information, the apparatus for accepting the information for specifying the image supply destination may display a list of schedule names and accept selection of at least one schedule name from this list.

Then, the apparatus for accepting the selection may acquire a list of user names who are associated with the selected schedule name, by referring the schedule information, and uses the acquired list as the information for specifying the image supply destinations. In this case, the information for specifying the group may be contained in the list instead of the user names or together with the user names.

Also, when the information for specifying a purpose should be accepted, the image formation apparatus 2 may form and output an image such as a character string indicating the information for specifying the purpose (conference name, group name, or the like) before or after forming an image based on each individual instruction.

[Superiority of Settings]

Also, this exemplary embodiment is not limited to the above examples. In view of the case where the image formation conditions, which are specified for the respective users should not be obeyed, a user who gives the image formation instruction may inhibit settings of a part of the image formation conditions from being changed.

In this example, the user who gives the image formation instruction specifies a setting to inhibit the specified setting from being changed. The image formation apparatus 2, which executes the process to generate the individual instruction, or the image formation instruction apparatus 1 accepts the concerned specification together with the image formation instruction, and stores the contents of the concerned specification.

Then, upon changing the setting contained in the image formation instruction in step S3 shown in FIG. 5 or step S13 shown in FIG. 11 by referring to the image formation condition elements having a relation with the image formation condition in question, the image formation apparatus 2 or the image formation instruction apparatus 1 checks as to whether or not the specification to inhibit the setting from being changed is given to the setting, which is going to be changed. Here, if the specification to inhibit the setting from being changed is given, the apparatus does not change the setting irrespective of the contents of the image formation condition in question. Also, if the specification to inhibit the setting from being changed is not given, the apparatus refers to the image formation condition elements having a relation with the image formation condition in question and then changes the settings in accordance with the image formation condition elements.

For example, the user who gives the image formation instruction may give the specification to inhibit a change of a setting of the paper size. In this case, even if the setting of the paper size in the image formation instruction is different from the image formation condition in question, the apparatus does not change this setting. Also, when the specification of the font size whose change of setting is not inhibited, if the setting of the font size in the image formation instruction is different from that in the image formation condition in question, the apparatus changes this setting.

[Priority among Conditions]

Also, in this exemplary embodiment, as described above, for example, when the paper a size is changed in accordance with the image formation condition in question, the font size is controlled to meet the changed paper size. In some cases, the font size changed by this control contradicts the specification of the smallest font size in the image formation condition in question. That is, in some cases, the contradiction occurs between the image formation condition elements.

Therefore, application priorities may be set to the respective image formation condition elements contained in the image formation conditions. In this case, the image formation apparatus 2, which executes the process to generate the individual instructions or the image formation instruction apparatus 1 refers sequentially to the image formation condition elements in step S3 in FIG. 5 or step S13 in FIG. 11. When a change of setting based on the referred the image formation condition element contradicts the contents specified by the image formation condition element having higher priority, the apparatus does not change the setting based on the referred image formation condition element.

By way of example, it is assumed that the user who specifies the image formation conditions designates such a condition that the image formation condition element regarding the smallest font size has a higher priority than the image formation condition element regarding the paper size. In this case, if the setting of the paper size in the image formation instruction is different from that of the image formation condition in question, the apparatus for generating the individual instructions generates changed contents of the respective settings in accordance with change of the paper size. Then, the apparatus compares the changed contents with the contents of the smallest font size, which is the image formation condition element having the higher priority. Here, the apparatus checks as to whether or not the change of the paper size from A3 to A4 results in that the specification of the font size, which is smaller than the smallest font size being specified by the image formation condition element, is contained, for example. Then, if such specification is contained, the apparatus does not perform the change of the paper size.

[Modification Examples]

In the above description, it is assumed that the image formation conditions, the group database and the like are stored in the storage section 12 of the image formation instruction apparatus 1 or the storage section 22 of the image formation apparatus 2. However, a way to store is not limited thereto. For example, the image formation conditions, the group database, and the like may be stored in an external server that is communicatively connected to the apparatus, which generates the individual instructions, via a communicating line such as the network. In this case, the apparatus, which generates the individual instructions, may acquire the image formation conditions and the contents of the group database from the external server, and may execute the process.

[Operation]

Next, an operation of the image formation apparatus 2 in one example of this exemplary embodiment will be described below. In this example, it is assumed that the image formation apparatus 2 optically reads a medium on which an original image is fixed (formed), and generates the image formation instructions.

The user sets the medium on which the original image is fixed on the scanner, selects a user(s) as a supply destination (s), and causes the scanner to start the scanning operation.

The image formation apparatus 2 optically reads the image fixed (formed) on the medium being set, and generates the image formation instruction to form the read image. Then, the image formation apparatus 2 starts the process of generating the individual instruction(s), and accepts the image formation instruction(s) generated in this process. Also, the image formation apparatus 2 accepts the information of the selected user(s) as the information for specifying the image supply destination(s. Here, it is assumed that, for example, the "user X" to the "user Z" illustrated in FIG. 2 are specified.

The image formation apparatus 2 acquires respective image formation conditions (Cx to Cz) that are associated with the respective supply destinations specified by the accepted information. Then, the image formation apparatus 2 refers sequentially to the acquired image formation conditions, changes the settings, which are different from the referred image formation conditions, out of the image forming settings contained in the accepted image formation instruction in accordance with the image formation conditions, and generates the individual instructions.

Here, it is specified in the image formation conditions Cx associated with the "user X" that the "smallest font size" is 8 point and the "centerline binding by staple" is applied for output. Also, it is specified in the image formation conditions Cy associated with the "user Y" that the "smallest font size" is 10 point, the "2 sided printing" is applied, and the "hole punching on the left side" is applied. Also, it is specified in the image formation conditions Cw, Cz associated with the "users W and Z" that the "smallest font size" is 10.5 point, images of two pages are formed on one surface of a sheet of paper ("2 pages/sheet"), and the "stapling on the upper left portion" is applied.

When there are the common image formation conditions, for example, the image formation apparatus 2 counts the number of such common image formation conditions. Here, there are two sets of image formation conditions that are common to Cw, one set of image formation conditions that is common to Cx, and one set of image formation conditions that is common to Cy. Therefore, the image formation apparatus 2 forms one image (one copy) according to the individual instruction generated based on the image formation conditions Cx. Also, the image formation apparatus 2 forms one image (one copy) according to the individual instruction generated based on the image formation conditions Cy. Then, the image formation apparatus 2 forms two images (two copies) according to the individual instruction generated based on the image formation conditions Cw.

In this manner, in this exemplary embodiment, the images are formed under the image formation conditions, which are specified in advance by the users who are the supply destinations. Therefore, the images formed under the image formation conditions, which are desired by the image supply destinations can be provided.

What is claimed is:

1. An image formation apparatus comprising:
    an accepting unit that accepts an image formation instruction and information of identifiers, the information of identifiers comprising a first identifier of a first user and a second identifier of a second user and the image formation instruction comprising an image formation setting;
    an acquiring unit that acquires a first image formation setting that is associated with the first identifier and a second image formation setting and a third image formation setting that are associated with the second identifier, determines a selection of one of the second image formation setting and the third image formation setting based on an image formation setting indicator relating to contents of the image formation instruction associated with the one of the second image formation setting and the third image formation setting, and selects the one of the second image formation setting and the third image formation setting based on a result of the selection determination;
    an instruction generation section that generates a first image formation instruction having the image formation setting of the image formation instruction replaced by the first image formation setting and generates a second image formation instruction having the image formation setting replaced by the selected one of the second image formation setting and the third image formation setting; and
    a formation unit that forms a first image based on the first image formation instruction and a second image based on the second image formation instruction.

2. The image formation apparatus according to claim 1, wherein the accepting unit accepts the image formation instruction from an image formation instruction apparatus.

3. The image formation apparatus according to claim 1, further comprising:
    a reading unit that reads an original,
    wherein the accepting unit accepts an image of the read original, and
    the formation unit forms the first image based on the image of the read original and the first image formation setting and forms the second image based on the image of the read original and the selected one of the second image formation setting and the third image formation setting.

4. The image formation apparatus according to claim 1, wherein the formation unit determines an order of forming the first image and the second image, based on the contents of the image formation instruction.

5. The image formation apparatus according to claim 1, further comprising:
    a generation unit that generates a list of the first user and the second user that are associated with the first image formation setting and the selected one of the second image formation setting and the third image formation setting acquired by the acquiring unit,
    wherein the formation unit outputs the generated list.

6. The image formation apparatus according to claim 1, wherein the first image formation setting, the second image formation setting, and the third image formation setting comprise a value of one of a smallest font size setting, a layout setting, a finishing setting, a bookbinding setting, and a paper size setting.

7. An image formation instruction apparatus comprising:
    an accepting unit that accepts an input of an image forming instruction to form an image and information of identifiers, the information of identifiers comprising a first identifier of a first user and a second identifier of a second user and the image formation instruction comprising an image formation setting;

an acquiring unit that acquires a first image formation setting that is associated with the first identifier and a second image formation setting and a third image formation setting that are associated with the second identifier, determines a selection of one of the second image formation setting and the third image formation setting based on an image formation setting indicator relating to contents of the image formation instruction associated with the one of the second image formation setting and the third image formation setting, and selects the one of the second image formation setting, and the third image formation setting based on a result of the selection determination;

an instruction generation section that generates a first image formation instruction having the image formation setting of the image formation instruction replaced by the first image formation setting and generates a second image formation instruction having the image formation setting replaced by the selected one of the second image formation setting and the third image formation setting; and an output unit that outputs the first image formation instruction and the second image formation instruction to an image formation apparatus.

8. An image formation system comprising:
an image formation instruction apparatus; and
an image formation apparatus,
wherein the image formation instruction apparatus comprises:
  an accepting unit that accepts an input of an image forming instruction to form an image and information of identifiers, the information of identifiers comprising a first identifier of a first user and a second identifier of a second user and the image formation instruction comprising an image formation setting;
  an acquiring unit that acquires a first image formation setting that is associated with the first identifier and a second image formation setting and a third image formation setting that are associated with the second identifier, determines a selection of one of the second image formation setting and the third image formation setting based an image formation setting indicator relating to contents of the image formation instruction associated with the one of the second image formation setting and the third image formation setting, and selects the one of the second image formation setting and the third image formation setting based on a result of the selection determination;
  an instruction generation section that generates a first image formation instruction having the image formation setting of the image formation instruction replaced by the first image formation setting and generates a second image formation instruction having the image formation setting replaced by the selected one of the second image formation setting and the third information setting; and
  an output unit that outputs the first image formation instruction and the second image formation instruction to the image formation apparatus, and
wherein the image formation apparatus comprises:
  a receiving unit that receives the first image formation instruction and the second image formation instruction output by the output; and
  a formation unit that forms the first image based on the received first image formation instruction and the second image based on the received second image formation instruction.

9. An image formation system comprising:
an image formation instruction apparatus; and
an image formation apparatus, wherein the image formation instruction apparatus comprises:
  an accepting unit that accepts an input of information of identifiers, the information of identifiers comprising a first identifier of a first user and a second identifier of a second user; and
  an output unit that outputs the information of identifiers and an instruction for forming an image, the image formation instructing the image forming apparatus to output the image and the image formation instruction comprising an image formation setting, and
wherein the image formation apparatus comprises:
  a receiving unit that receives the image formation instruction output by the output unit;
  an acquiring unit that acquires a first image formation setting that is associated with the first identifier and a second image formation setting and a third image formation setting that are associated with the second identifier, determines a selection of one of the second image formation setting and the third image formation setting based on an image formation setting indicator relating to contents of the image formation instruction associated with the one of the second image formation setting and the third image formation setting, and selects the one of the second image formation setting and the third image formation setting based on a result of the selection determination;
  an instruction generation section that generates a first image formation instruction having the image formation setting of the image formation instruction replaced by the first image formation setting and generates a second image formation instruction having the image formation setting replaced by the selected one of the second image formation setting and the third information setting; and
  a formation unit that forms the first image based on the first image formation instruction and a second image based on the second image formation instruction.

10. A non-transitory computer-readable medium storing a program that causes a computer to execute an image formation process, the image formation process comprising:
accepting an image formation instruction and information of identifiers, the information of identifiers comprising a first identifier of a first user and a second identifier of a second user and the image formation instruction comprising an image formation setting;
acquiring a first image formation setting that is associated with the first identifier and a second image formation setting and a third image formation setting that are associated with the second identifier;,
determining a selection of one of the second image formation setting and the third image formation setting based on an image formation setting indicator relating to contents of the image formation instruction associated with the one of the second image formation setting and the third image formation setting;
selecting the one of the second image formation setting and the third image formation setting based on a result of the selection determination;
generating a first image formation instruction having an image formation setting of the image formation instruction replaced by the first image formation setting and generates a second image formation instruction having the image formation setting replaced by the selected one of the second image formation setting and the third image formation setting; and forming a first image based on the first image formation instruction and a second image based on the second image formation instruction.

11. The non-transitory computer-readable medium according to claim 10, wherein the accepting comprises accepting the image formation instruction from an image formation instruction apparatus.

12. The non-transitory computer-readable medium according to claim 10, wherein the image formation process further comprises reading an original image of a medium, the accepting comprises accepting an image of the read original, and the forming comprises forming the first image based on the read original and the first image formation setting and the second image based on the read original and the selected one of the second image formation setting and the third image formation setting.

13. A non-transitory computer-readable medium storing a program that causes a computer to execute an image formation process, the image formation process comprising:

accepting an input of an image forming instruction to form an image and information of identifiers, the information of identifiers comprising a first identifier of a first user and a second identifier of a second user and the image formation instruction comprising an image formation setting;

acquiring a first image formation setting that is associated with the first identifier and a second image formation setting and a third image formation setting that is-are associated with the second identifier;

determining a selection of one of the second image formation setting and the third image formation setting based on an image formation setting indicator relating to contents of the image formation instruction associated with the one of the second image formation setting and the third image formation setting;

selecting the one of the second image formation setting and the third image formation setting based on a result of the selection determination;

generating a first image formation instruction having an image formation setting of the image formation instruction replaced by the first image formation setting and generates a second image formation instruction having the image formation setting replaced by the selected one of the second image formation setting and the third image formation setting; and outputting the first image formation instruction and the second image formation instruction to an image forming apparatus.

* * * * *